US010614193B2

(12) United States Patent
Dwivedi et al.

(10) Patent No.: US 10,614,193 B2
(45) Date of Patent: Apr. 7, 2020

(54) POWER MODE-BASED OPERATIONAL CAPABILITY-AWARE CODE COVERAGE

(71) Applicant: Mentor Graphics Corporation, Wilsonville, OR (US)

(72) Inventors: Pankaj Kumar Dwivedi, New Delhi (IN); Shweta Gulati, New Delhi (IN)

(73) Assignee: Mentor Graphics Corporation, Wilsonville, OR (US)

( * ) Notice: Subject to any disclaimer, the term of this patent is extended or adjusted under 35 U.S.C. 154(b) by 92 days.

(21) Appl. No.: 15/885,098

(22) Filed: Jan. 31, 2018

(65) Prior Publication Data

US 2018/0218092 A1    Aug. 2, 2018

(30) Foreign Application Priority Data

Jan. 31, 2017   (IN) .............................. 201741003576

(51) Int. Cl.
   *G06F 17/50* (2006.01)

(52) U.S. Cl.
   CPC ........ *G06F 17/5081* (2013.01); *G06F 17/504* (2013.01); *G06F 17/5068* (2013.01); *G06F 17/5027* (2013.01); *G06F 2217/78* (2013.01)

(58) Field of Classification Search
   None
   See application file for complete search history.

(56) References Cited

U.S. PATENT DOCUMENTS

| 5,680,332 | A  | * | 10/1997 | Raimi | G01R 31/318357 |
| | | | | | 703/13 |
| 6,427,223 | B1 | * | 7/2002 | Kim | G06F 17/5022 |
| | | | | | 324/762.02 |
| 7,281,185 | B2 | * | 10/2007 | Maoz | G01R 31/31707 |
| | | | | | 714/738 |

(Continued)

OTHER PUBLICATIONS

F. Bembaron et al., "Low Power Verification Methodology Using UPF," 2009 DVCON Conference on Electronic Systems Design and Verification Solutions, pp. 228-233. (Year: 2009).*

(Continued)

*Primary Examiner* — Leigh M Garbowski
(74) *Attorney, Agent, or Firm* — Mentor Graphics Corporation

(57) ABSTRACT

This application discloses a design verification tool implementing in a functional verification environment with a computing system, a hardware emulator, or a combination thereof. The design verification tool can identify, from a power intent specification of a circuit design, operational states of circuitry described in the circuit design, and generate code coverage bins based on the operational states of the circuitry. The operational states of the circuitry correspond to operational capabilities of the circuitry supported by each of the power modes for the circuitry. The code coverage bins are configured to store code coverage events occurring when the circuitry operates in different power modes. The design verification tool can utilize the code coverage bins to record the code coverage events performed by the circuitry during functional verification operations in (Continued)

a verification environment, and also can generate at least one coverage metric based on the records of the code coverage events.

17 Claims, 6 Drawing Sheets

(56) References Cited

U.S. PATENT DOCUMENTS

| | | | | |
|---|---|---|---|---|
| 7,770,142 | B1 * | 8/2010 | Shmayovitsh | G06F 17/5036 716/109 |
| 8,856,556 | B2 * | 10/2014 | Tsuchiya | G06F 17/5045 713/300 |
| 9,002,694 | B2 * | 4/2015 | Feng | G06F 17/5036 703/18 |
| 9,891,281 | B1 * | 2/2018 | Kinderman | G01R 31/3177 |
| 10,133,803 | B2 * | 11/2018 | May | G06F 16/258 |
| 2016/0246913 | A1 * | 8/2016 | Verma | G06F 17/5022 |

OTHER PUBLICATIONS

Accellera Systems Initiative, Unified Coverage Interoperability Standard (UCIS), Version 1.0, 362 pages. (Year: 2012).*

A. Hazra et al., "Power-Tructor: An Integrated Tool Flow for Formal Verification and Coverage of Architectural Power Intent," IEEE Trans. on CAD of ICs & Systems, vol. 32, No. 11, Nov. 2013, pp. 1801-1813. (Year: 2013).*

IEEE Computer Society, IEEE Standard for Design Verification of Low-Power Integrated Circuits, May 29, 2013, 348 pages. (Year: 2013).*

IEEE Computer Society and IEEE Standards Association Corporate Advisory Group, IEEE Standard for SystemVerilog—Unified Hardware Design, Specification, and Verification Language, Feb. 21, 2013, 1315 pages. (Year: 2013).*

A. Yehia, UCIS Applications: Improving Verification Productivity, Simulation Throughput, and Coverage Closure Process, DVCon 2013, 13 pages. (Year: 2013).*

* cited by examiner

POWER MODE-BASED OPERATIONAL CAPABILITY-AWARE CODE COVERAGE

RELATED APPLICATIONS

This claims priority under § 119 to Indian Patent Application No. 201741003576, entitled "POWER MODE-BASED OPERATIONAL CAPABILITY-AWARE CODE COVERAGE," filed Jan. 31, 2017, which is incorporated herein by reference in its entirety.

TECHNICAL FIELD

This application is generally related to electronic design automation and, more specifically, to power mode-based operational capability-aware code coverage for functional verification of a circuit design.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Typically, software and hardware "tools" verify the design at various stages of the design flow by running simulators and/or hardware emulators, or by utilizing formal techniques, allowing any errors in the design discovered during the verification process to be corrected.

Initially, a specification for a new electronic system can be transformed into a logical design, sometimes referred to as a register transfer level (RTL) description of the electronic system. With this logical design, the electronic system can be described in terms of both the exchange of signals between hardware registers and the logical operations that can be performed on those signals. The logical design typically employs a Hardware Design Language (HDL), such as System Verilog or Very high speed integrated circuit Hardware Design Language (VHDL).

The logic of the electronic system can be analyzed to confirm that it will accurately perform the functions desired for the electronic system, sometimes referred to as "functional verification." A design verification tool can perform functional verification operations, such as simulating, emulating, and/or formally verifying the logical design. For example, when the design verification tool simulates the logical design, the design verification tool can provide transactions or sets of test vectors, for example, generated by a simulated test bench, to the simulated logical design. The design verification tool can determine how the simulated logical design responded to the transactions or test vectors, and verify, from that response, that the logical design describes circuitry to accurately perform functions.

The design verification tool also can quantify how well the test vectors input to a logical design under verification came to covering or adequately exercising the logical design. For example, the design verification tool can record when certain portions of code for the logical design were executed during functional verification of the logical design. Traditional code coverage identifies which portions of the logical design under verification were utilized or exercised, while those portions were in a normal operational state or a normal power mode.

Many of today's electronic systems are designed to be power efficient, and thus may have multiple different power domains, each of which can have multiple different power modes. The different power modes for the different power domains can have functional dependencies in the logical design. For example, a functionality of the logical design and associated electronic system can change based on power mode, such as when portions of the logical design have a power mode that renders those portions not fully operational. In some instances, the power modes can cause structural changes in the logical design under verification by introducing new objects or hierarchies in the logical design. The power modes also can cause behavioral changes in existing combinatorial and/or sequential blocks. Since conventional design verification tools ignore collecting coverage events for operations of the logical design while in non-normal power modes, verification engineers have a difficult time determining whether functional verification operations exercised the logical design while in the different power modes and associated operational states for the electronic system.

SUMMARY

This application discloses a design verification tool implementing in a functional verification environment with a computing system, a hardware emulator, or a combination thereof. The design verification tool can identify, from a power intent specification of a circuit design, operational states of circuitry described in the circuit design, and generate code coverage bins based on the operational states of the circuitry. The operational states of the circuitry correspond to operational capabilities of the circuitry supported by each of the power modes for the circuitry. The code coverage bins are configured to store code coverage events occurring when the circuitry operates in different power modes. The design verification tool can utilize the code coverage bins to record the code coverage events performed by the circuitry during functional verification operations in a verification environment, and also can generate at least one coverage metric based on the records of the code coverage events. Embodiments will be described below in greater detail.

DETAILED DESCRIPTION

Illustrative Operating Environment

Figure 1:
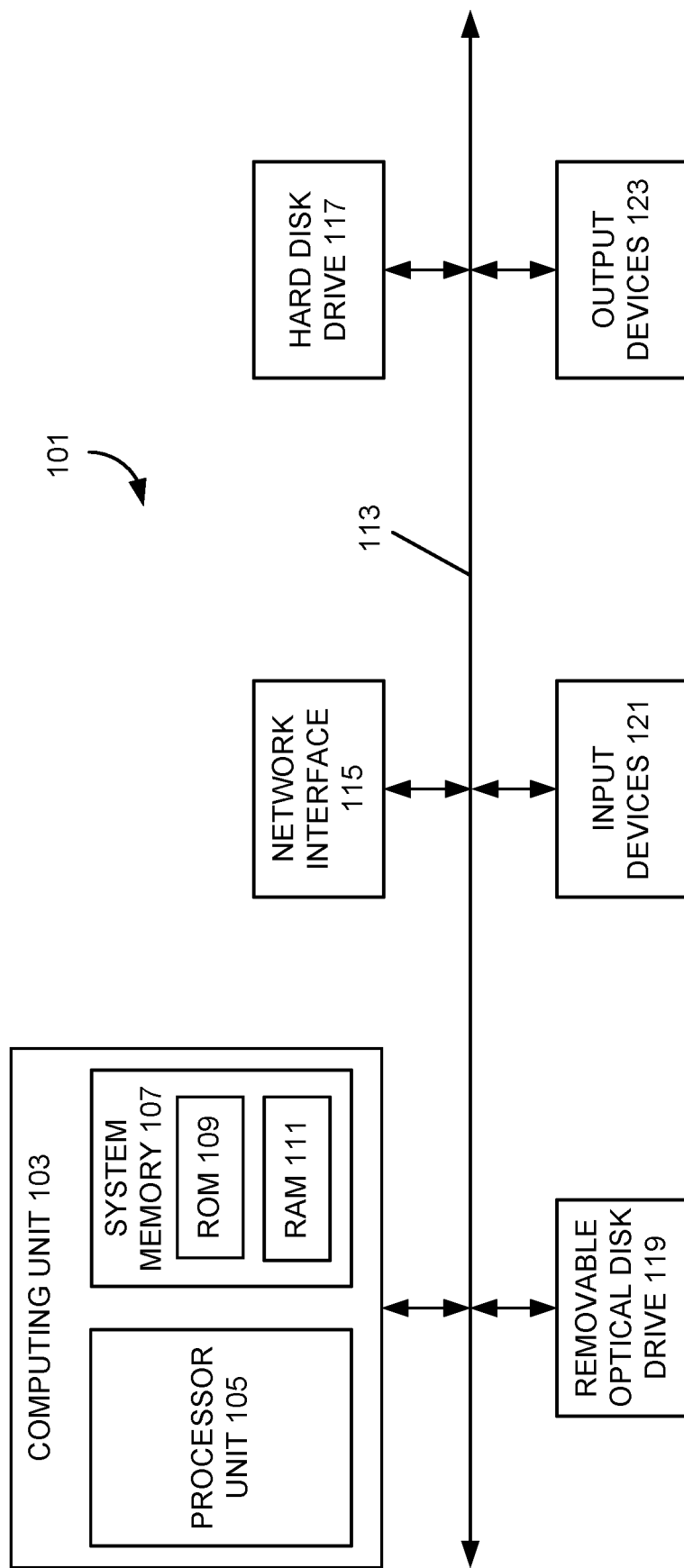
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
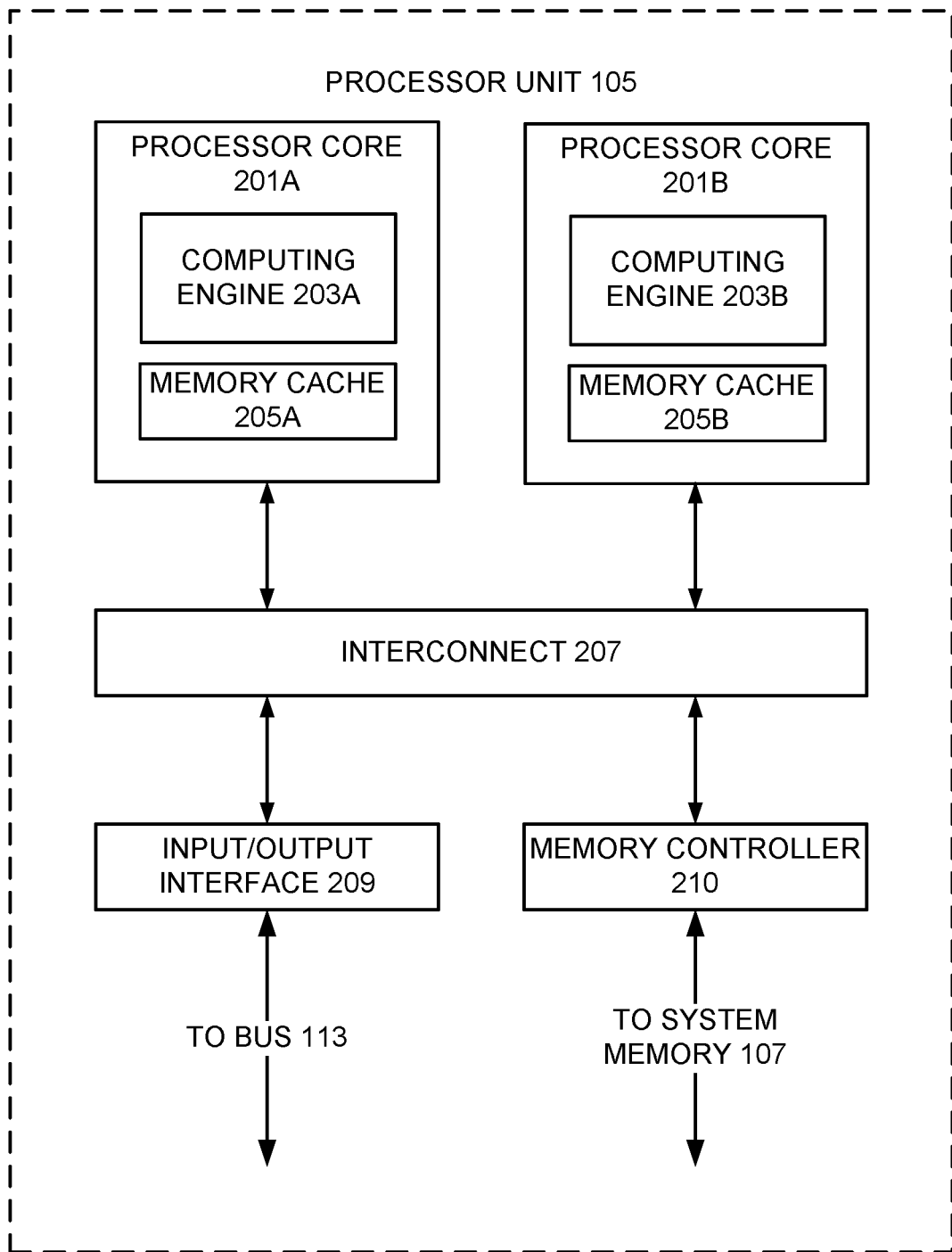

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Power Mode-Based Operational Capability-Aware Code Coverage

Figure 3:
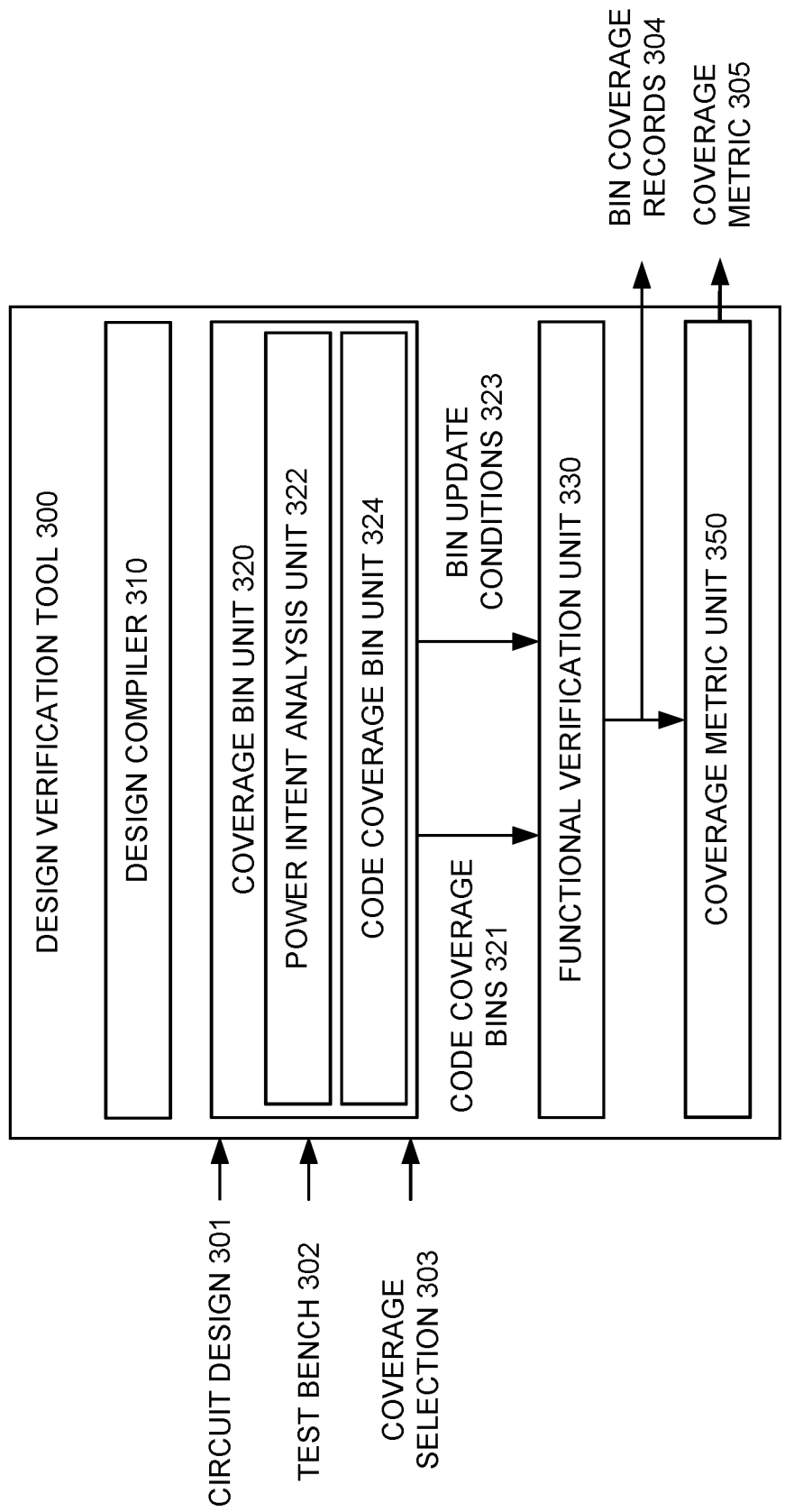
FIG. 3 illustrates an example of a design verification tool implementing power mode-based operational capability-aware code coverage according to various embodiments.

FIG. 3 illustrates an example of a design verification tool 300 implementing power mode-based operational capability-aware code coverage according to various embodiments of the invention. Referring to FIG. 3, the design verification tool 300 can receive a circuit design 301, which can describe an electronic device both in terms of an exchange of data signals between components in the electronic device, such as hardware registers, flip-flops, combinational logic, or the like, and in terms of logical operations that can be performed on the data signals in the electronic device. The circuit design 301 can model the electronic device at a register transfer level (RTL), for example, with code in a hardware description language (HDL), such as System Verilog, Very high speed integrated circuit Hardware Design Language (VHDL), System C, or the like. In some embodiments, the design verification tool 310 can receive the circuit design 301 from a source external to the design verification tool 310, such as a user interface of the computing device 101, another tool implemented by the computing device 101, or the design verification tool 310 may internally generate the circuit design 301.

The circuit design 301 also can be annotated with a power intent specification, for example, expressed in a format corresponding to a Unified Power Format (UPF) specification described by Institute of Electrical and Electronics Engineers (IEEE) Standard 1801. The power intent specification can include description of various power-related design intentions, such as power domains, simstates, power supply nets, power states or modes, power controls, electrical protection schemes, memory retention schemes, or the like. Each of the power domains can include a plurality of design elements corresponding to circuitry in the circuit design 301, which can share a common primary supply or supply set.

The simstates in the power intent specification can define levels of operational capability supported by a supply set being shared by circuitry in a power domain. Each the supply set can define multiple different simstates. In some embodiments, the simstates can include a normal mode, a corrupt mode, a corrupt on activity mode, a corrupt state on activity mode, and/or a corrupt state on change mode. The normal mode can include a power level of a supply set sufficient to support full operational capabilities of circuitry operating in the normal mode. The corrupt mode can include a power level of the supply set that is either off or at a sufficiently low level to not support switching and/or retention of logic state in circuitry of the circuit design 301. The corrupt on activity mode can include a power level of the supply set insufficient to support activity in circuitry of the circuit design 301, but having a sufficient level for retention of logic state in circuitry of the circuit design 301. The corrupt state on activity mode can include a power level of the supply set sufficient to support combinational logic in the circuit design 301, but having an insufficient level to support activity inside state elements in circuitry of the circuit design 301. The corrupt state on change mode can include a power level of the supply set sufficient to support combinational logic in the circuit design 301, but insufficient to support a change of state for state elements in circuitry of the circuit design 301.

The design verification tool 300, in some embodiments, can receive a test bench 302 capable of defining test stimuli, for example, clock signals, activation signals, power signals, control signals, and data signals that, when grouped, may form test bench transactions capable of prompting operation of the circuit design 301 in a verification environment, such as a simulation environment, an emulation environment, or the like. In some embodiments, the test bench 302 can be written in an object-oriented programming language, for example, SystemVerilog or the like. A methodology library, for example, a Universal Verification Methodology (UVM) library, an Open Verification Methodology (OVM) library, an Advanced Verification Methodology (AVM) library, a Verification Methodology Manual (VMM) library, or the like, can be utilized as a base for creating the test bench 302. In some embodiments, the design verification tool 300 can receive the test bench 302 from a source external to the design verification tool 300, such as a user interface of the computer network 101, another tool implemented by the computer network 101, or the design verification tool 300 may generate the test bench 302 internally.

The design verification tool 300 can include a design compiler 310 to compile the circuit design 301 and the test bench 302 into a format usable in a verification environment. The design verification tool 300 can include a functional verification unit 330 to implement the verification environment, which can simulate and/or emulate the circuit design 301 and the test bench 302 based on the compiled code from the design compiler 310. In some embodiments, the functional verification unit 330 can include a simulator to simulate the functional operations performed by the circuit design 301 based on test stimulus generated by the test bench 302. The functional verification unit 330 can include a hardware emulator to emulate the circuit design 301 with programmable hardware, such as arrays of field programmable gate array (FPGA) chips, arrays of processors, a combination thereof, or the like. The functional verification unit 330 can generate waveform data corresponding to the functional operation of the circuit design 301 in the verification environment in response to test stimulus generated by the test bench 302. The design verification tool 300 (or a tool external to the design verification tool 300) can perform a functional verification of the circuit design 301, for example, by comparing the waveform data with an expected output from the circuit design 301 in response the test stimulus generated by the test bench 302.

In some embodiments, the functional verification unit 330 also can utilize formal techniques, for example, implemented in a computing system, to functionally verify one or more portions of the circuit design 301. The formal techniques can attempt to prove or disprove functionality of circuit design 301, and can include utilization of a Binary Decision Diagram (BDD), a Boolean Satisfiability (SAT) Solver, an Automatic Test Pattern Generator (ATPG), Cut Point Prover, or the like.

The design verification tool 300 also can determine various types of code coverage, for example, how well the functional verification exercised the circuit design 301. The design compiler 310 can receive a coverage selection 303, for example, as input from a user interface, which can describe one or more coverage types for the design verification tool 300 to collect in the verification environment. For example, the coverage types can include statement coverage, expression coverage, toggle coverage, finite state machine (FSM) coverage, or the like.

The design verification tool 300 can include a coverage bin unit 320 to generate coverage bins 321, for example, based on the coverage types identified in the coverage selection 303. The code coverage bins 321 can be utilized by the design verification tool 300 to record occurrences of code coverage events during the functional verification of the circuit design 301 in the verification environment. For example, when the coverage selection 303 indicates that statement coverage was selected, the coverage bin unit 320 can generate at least one code coverage bin for each line of code in the circuit design 301. When the functionality associated with a line of code is realized during simulation or emulation of the circuit design 301, such as when that the line of code was executed during simulation or emulation, the design verification tool 300 can record an occurrence of a statement coverage event in at least one of the code coverage bins corresponding to that line of code.

The coverage bin unit 320 can include a power intent analysis unit 322 to identify operational states for circuitry in the circuit design 301 from the power intent specification of the circuit design 301. The operational states of the circuitry can correspond to operational capabilities of the circuitry supported by each of the power modes for the circuitry. In some embodiments, the operational states can correspond to simstates defined in the power intent specification of the circuit design 301.

The coverage bin unit 320 can include a code coverage bin unit 324 to utilize the identified operational states for the circuitry in the circuit design 301 to generate the code coverage bins 321. When circuitry in the circuit design 301 includes multiple operational states, the code coverage bin unit 324 can generate the code coverage bins 321 for code coverage events occurring while the circuitry operates in the different operational states. For example, when a portion of the circuit design 301 can operate in 5 simstates, such as a normal mode, a corrupt mode, a corrupt on activity mode, a corrupt state on activity mode, and a corrupt state on change mode, the code coverage bin unit 324 implementing statement coverage can generate five code coverage bins for each line of code in the portion of the circuit design 301. In other words, each line of code in the portion of the circuit design 301 can have a code coverage bin corresponding to each of the different simstates. For a finite state machine capable of operating in 5 simstates, the code coverage bin unit 324 can implement finite state machine coverage by generating a code coverage bin for active states of the finite state machine, for transitions between the active states, for each of the different simstates, for transitions between the simstates and the active states of the finite state machine, and for transitions between the simstates. Embodiments of code coverage bin generation for finite state machine coverage will be described below in FIGS. 5A-5C.

Figure 5B:
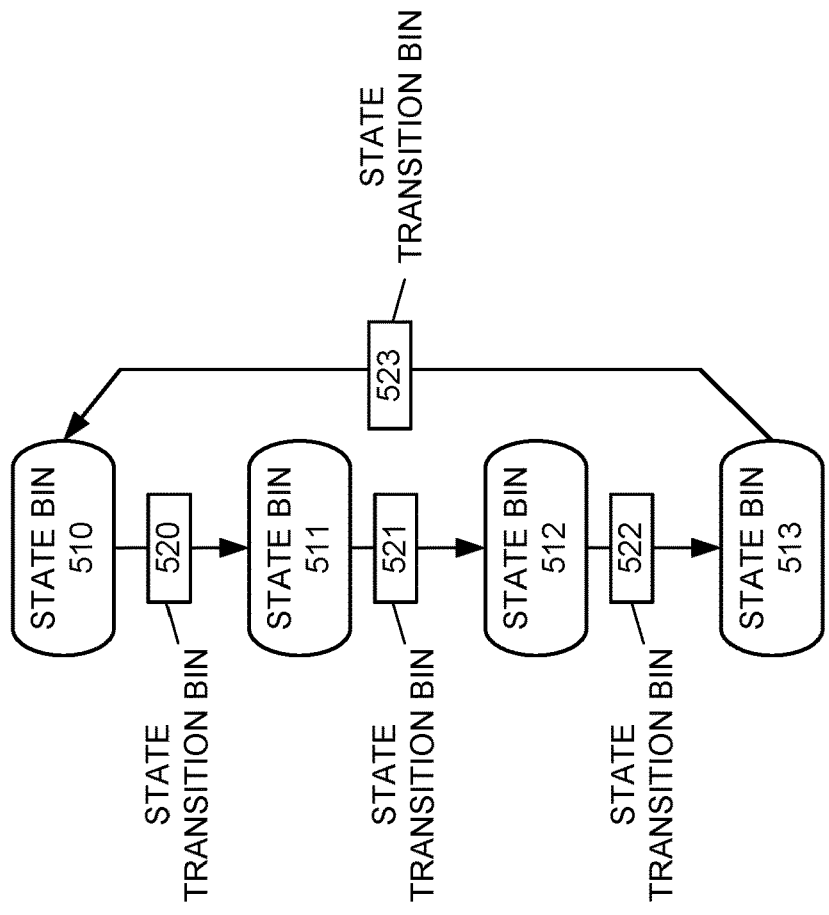
FIGS. 5A-5C illustrate an example finite state machine and finite state machine coverage models with and without power mode-based operational capability-aware code coverage according to various embodiments.
Figure 5A:
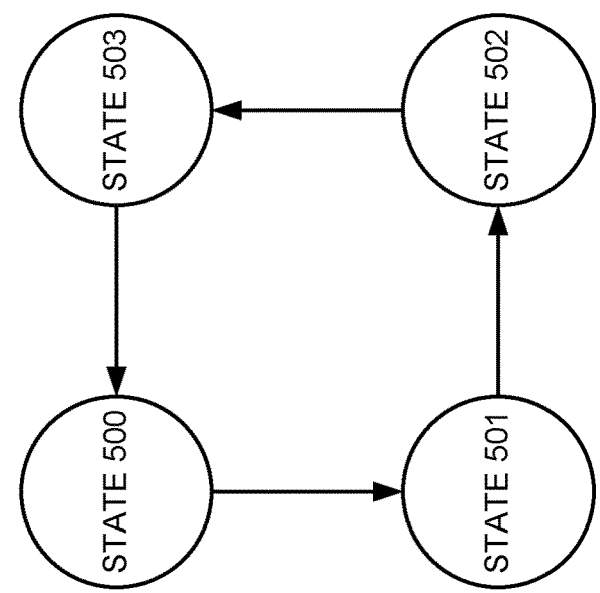
Figure 5C:
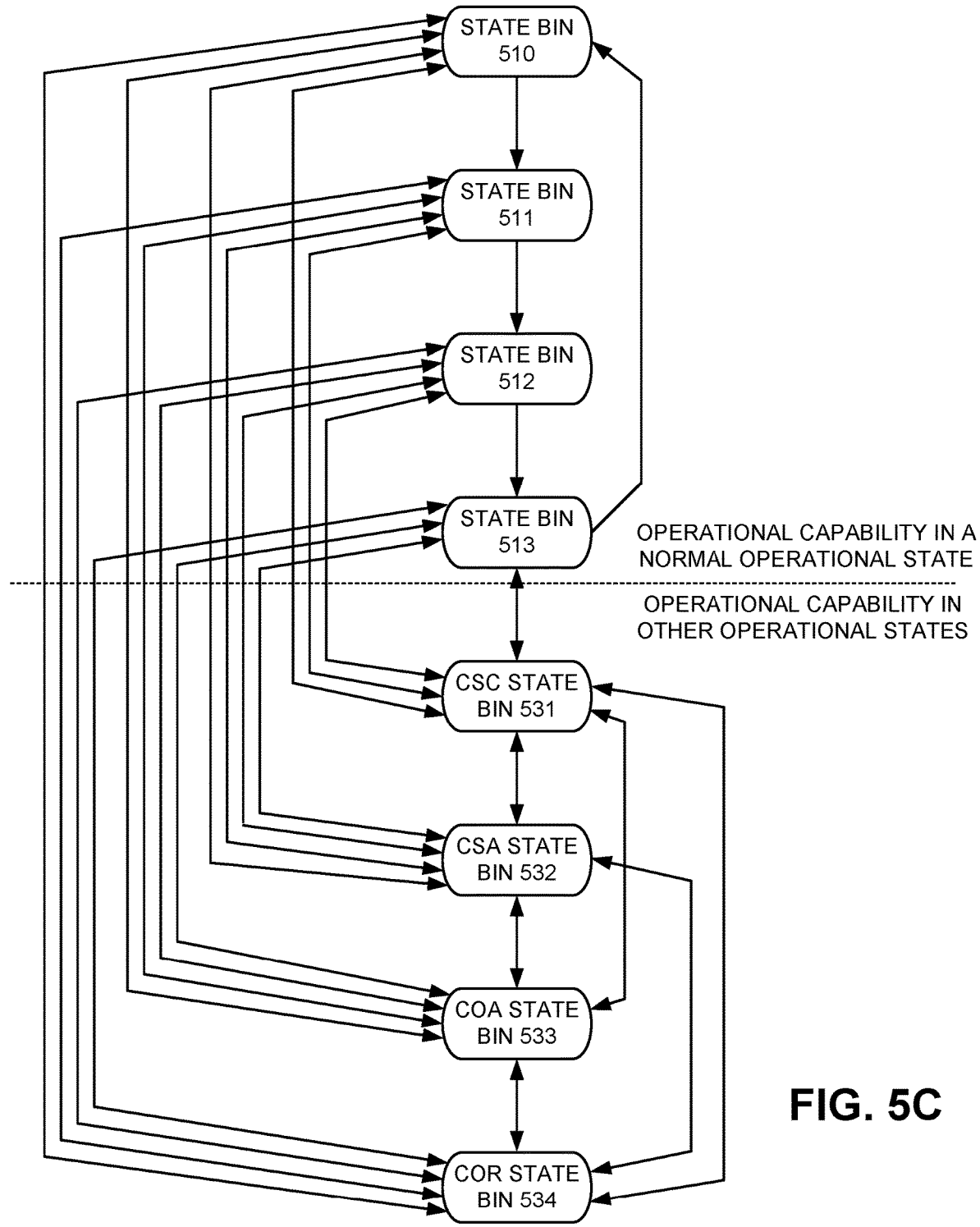

FIGS. 5A-5C illustrate an example finite state machine and finite state machine coverage models with and without power mode-based operational capability-aware code coverage according to various embodiments. Referring to FIG. 5A, an example finite state machine in a circuit design can include four different states 500-503. While in an active or normal mode of operation, the finite state machine can transition from state 500 to state 501, from state 501 to state 502, from state 502 to state 503, and from state 503 to state 500.

Referring to FIG. 5B, an example finite state machine coverage model for the finite state machine shown in FIG. 5A is shown for normal operational state of the finite state machine. The finite state machine coverage model can include state coverage bins 510-513, which can correspond to states 500-503, respectively, in the finite state machine shown in FIG. 5A. The finite state machine coverage model also can include state transition coverage bins 520-523 corresponding to the transitions between the states 500-503. For the transition from state 500 to state 501, the finite state machine coverage model can include state transition coverage bin 520 between the state coverage bins 510 and 511. For the transition from state 501 to state 502, the finite state machine coverage model can include state transition coverage bin 521 between the state coverage bins 511 and 512. For the transition from state 502 to state 503, the finite state machine coverage model can include state transition coverage bin 522 between the state coverage bins 512 and 513. For the transition from state 503 to state 500, the finite state machine coverage model can include state transition coverage bin 523 between the state coverage bins 513 and 510.

Referring to FIG. 5C, an example operational capability-aware finite state machine coverage model for the finite state machine is shown for multiple operational states of the finite state machine. The operational capability-aware finite state machine coverage model can correspond to operational capacity in a normal operational state and in other operational states of the finite state machine. The portion of the operational capability-aware finite state machine coverage model describing the operational capacity in a normal operational state can include the state bins 510-513 and associated state transition bins corresponding to the transition lines between the state bins 510-513. The portion of the operational capability-aware finite state machine coverage model describing the operational capacity in other operational states can include the state bins 531-534 and associated state transition bins corresponding to the transition lines between the state bins 510-513 and 531-534. The state bins 531-534 can include a CSC state bin 531 corresponding to a corrupt state on change operational state for the finite state machine, a CSA state bin 532 corresponding to a corrupt state on activity operational state for the finite state machine, a COA state bin 533 corresponding to a corrupt on activity operational state for the finite state machine, and a COR state bin 534 corresponding to a corrupt operational state for the finite state machine. The transition lines between the state bins 510-513 and 531-534 can be unidirectional, which indicates the operational capability-aware finite state machine coverage model has one state transition bin corresponding to the directionality of the transition line. The transition lines between the state bins 510-513 and 531-534 can be unidirectional also may be bi-directional, which indicates the operational capability-aware finite state machine coverage model has one state transition bin corresponding to each direction of the transition line.

Referring back to FIG. 3, in some embodiments, the code coverage bin unit 324 also can generate bin update conditions 323, which can indicate when one or more of the code coverage bins 321 can record a code coverage event. For example, when the functional verification unit 330 identifies a transition from a normal simstate to one of the corrupt-based simstates, the bin update conditions 323 can indicate when code coverage events associated with the transition should be recorded in the code coverage bins 321. In some instances, the functional verification unit 330, based on the bin update conditions 323, can record the code coverage event based on the transition, for example, when the transition is between a normal simstate and a corrupt simstate. In one or more other instances, the functional verification unit 330, based on the bin update conditions 323, can wait to record code coverage events based on the transition until a subsequent action occurs during functional verification, for example, a state change, an input signal change, or the like.

The functional verification unit 330 can perform functional verification operations on the circuit design 301. In some embodiments, the functional verification unit 330 can simulate or emulate of the circuit design 301, for example, providing test stimulus to the simulated or emulated circuit design 301. The functional verification unit 330 also can analyze the circuit design 301 utilizing one or more formal techniques, such as a Binary Decision Diagram (BDD), a Boolean Satisfiability (SAT) Solver, an Automatic Test Pattern Generator (ATPG), Cut Point Prover, or the like.

The functional verification unit 330 can collect coverage data during verification operations. For example, the functional verification unit 330 can record information, such as a hierarchy of the design under verification, a test plan that includes the test bench or other test information, results of the verification operations, and coverage information, such as code coverage or functional coverage. The code coverage events can identify how well verification operations, such as simulation, emulation, and/or formal verification, came to covering or adequately exercising the circuit design 301 under verification. In some embodiments, code coverage, such as statement coverage, expression coverage, branch coverage, toggle coverage, state machine coverage, or the like, can identify which lines, statements, expressions, decisions, toggles, states, or the like, of the circuit design 301 were exercised by the test bench 302 during verification operations, while functional coverage can quantify how well a circuit design 301 had its functionality exercised during verification operations.

The functional verification unit 330 can detect code coverage events, such as execution of statements, expressions, or branches, toggles in circuitry, state transitions in a finite state machine, or the like, associated with the circuit design 301, for example, in response to test stimulus generated by the test bench 302. The functional verification unit 330 can record occurrences of the code coverage events in corresponding code coverage bins 321, and generate bin records 304 from the records in the code coverage bins 321. In some embodiments, the functional verification unit 330 can implement the code coverage bins 321 in the verification environment with counters, for example, one counter for each of the code coverage bins 321. The functional verification unit 330 can output the bin coverage records 304, for example, for storage in a coverage database.

The functional verification unit 330 can utilize the recorded information to generate the bin coverage records 304 so they conform to a coverage data model. In some embodiments, the bin coverage records 304 generated by the functional verification unit 330 can be compliant with a Unified Coverage Interoperability Standard (UCIS), which defines features a coverage data model is to include in order to be standard-compatible. The functional verification unit 330 can store the bin coverage records 304 into the coverage database. In some embodiments, the coverage database can be compliant with the UCIS, meaning it supports bin coverage records 304 having standard-compatible coverage data models.

The design verification tool 300 can include a coverage metric unit 350 to generate one or more coverage metrics 305 based on the bin coverage records 304. The coverage metrics 305 can indicate which portions of the circuit design 301 were utilized in response to test stimulus generated by the test bench 302 in the verification environment. For example, the coverage metric unit 350 can determine statement coverage, expression coverage, toggle coverage, finite state machine coverage, or the like, from the bin coverage records 304. Although FIG. 3 shows the coverage metric unit 350 in the design verification tool 300, in some embodiments, the coverage metric unit 350 may be included in a tool (not shown) external from the design verification tool 300.

Figure 4:
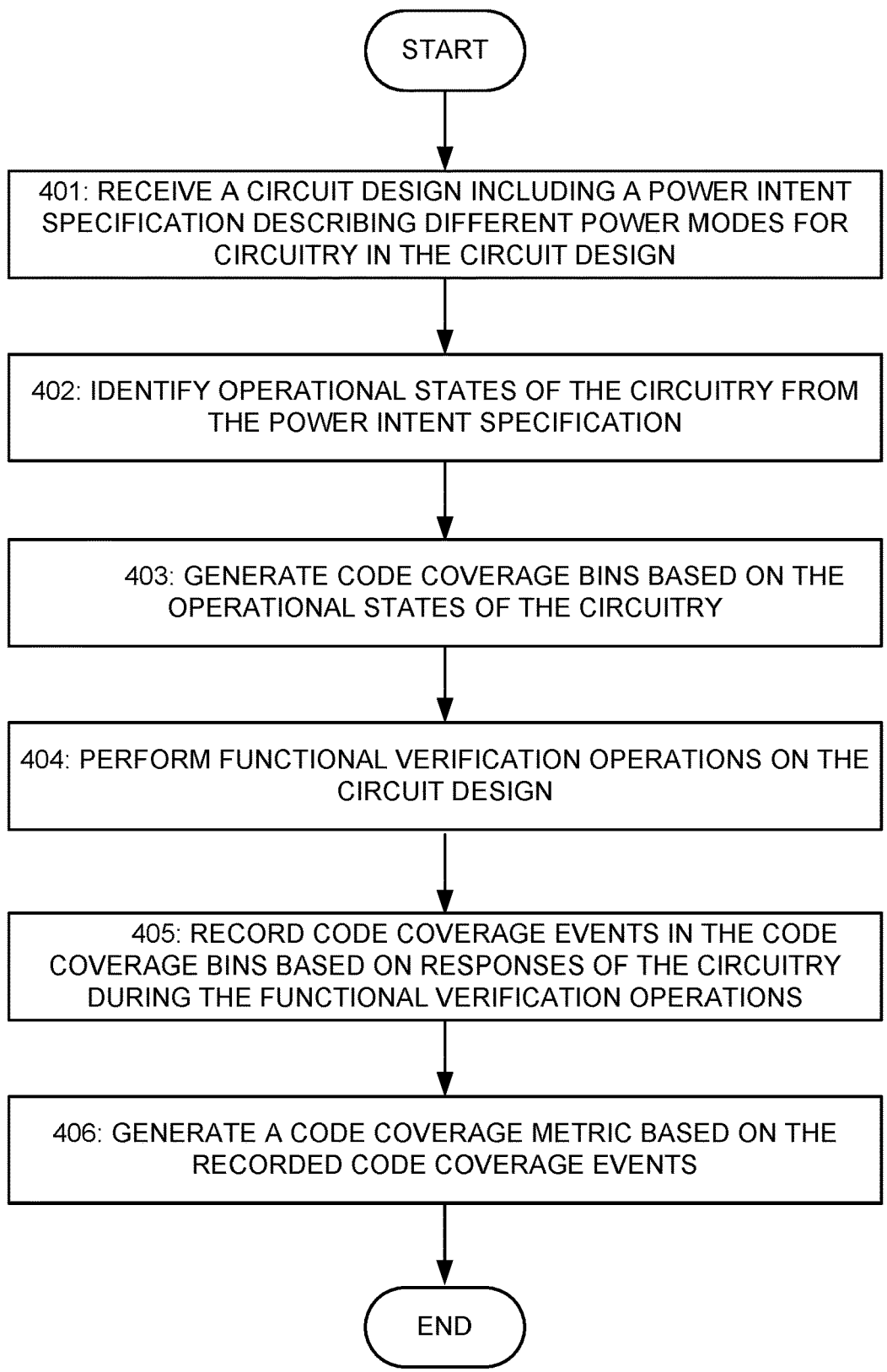
FIG. 4 illustrates a flowchart showing an example implementation of power mode-based operational capability-aware code coverage according to various embodiments.

FIG. 4 illustrates a flowchart showing an example implementation of power mode-based operational capability-aware code coverage according to various embodiments. Referring to FIG. 4, in a block 401, a design verification tool can receive a circuit design including a power intent specification describing different power modes for circuitry in the circuit design. The power intent specification, in some embodiments, can be formatted corresponding to a Unified Power Format (UPF) specification described by Institute of Electrical and Electronics Engineers (IEEE) Standard 1801. The power intent specification can include description of various power-related design intentions, such as power domains, simstates, power supply nets, power states or modes, power controls, electrical protection schemes, memory retention schemes, or the like.

In a block 402, the design verification tool can identify operational states of the circuitry from the power intent specification. The operational states can define levels of operational capability of the circuitry supported by a supply set. In some embodiments, the power intent specification can identify simstates, which can correspond to the operational states of the circuitry. The simstates can include a normal mode, a corrupt mode, a corrupt on activity mode, a corrupt state on activity mode, and/or a corrupt state on change mode.

In a block 403, the design verification tool can generate code coverage bins based on the operational states of the circuitry. The design verification tool can utilize the identified operational states for the circuitry in the circuit design to generate the code coverage bins. When circuitry in the circuit design includes multiple operational states, the code coverage bin unit can generate the code coverage bins for code coverage events occurring while the circuitry operates in the different operational states.

In some embodiments, the design verification tool can generate code coverage bins for operation of the circuitry in a normal operational state, for example, when supply sets provide the circuitry with a power supply allowing the circuitry to have full operational capability. The design verification tool can also generate additional code coverage bins corresponding to the other operational states, such as the corrupt mode, the corrupt on activity mode, the corrupt state on activity mode, and/or the corrupt state on change mode. In some embodiments, the design verification tool can generate the additional code coverage bins by identifying the code coverage bins corresponding to the normal operational state and generating one additional code coverage bin per non-normal operational state for the circuitry.

In some embodiments, the design verification tool can define rules for when the design verification tool can record code coverage events with the additional code coverage bins. For example, some of the rules can identify one or more conditions for the design verification tool to record the code coverage events with the additional code coverage bins. For example, when there is a transition from a normal simstate to a corrupt on activity simstate or a corrupt on state activity simstate for circuitry, the rules can direct the design verification tool to condition a recordation of a code coverage event corresponding to the transition in one of the additional code coverage bins until an input signal changes for the circuitry.

In a block 404, the design verification tool can perform functional verification operations on the circuit design, and in a block 405, the design verification tool can record code coverage events in the code coverage bins based on responses of the circuitry during the functional verification operations. As discussed above, the functional verification operations on the circuit design can include simulation, emulation, or formal verification of at least a portion of the circuit design. The design verification tool can record the code coverage events in the additional code coverage bins based, at least in part, on the rules defined by the design verification tool. In some embodiments, each of the code coverage bins can have a corresponding counter, which the design verification tool can increment based on the code coverage events and, in some instances, a satisfaction of the rules.

In a block 406, the design verification tool can generate a code coverage metric based on the recorded code coverage events. The coverage metrics can indicate which portions of the circuit design were utilized in response to test stimulus generated by the test bench in the verification environment. For example, the coverage metric unit can determine statement coverage, expression coverage, toggle coverage, finite state machine coverage, or the like, from the recorded code coverage events. Since the design verification tool can record code coverage events occurring in operational states other than a normal operational state, the code coverage metric can describe code coverage for circuitry in the circuit design corresponding to non-normal operational states of the circuitry.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, from a power intent specification of a circuit design, operational states of circuitry described in the circuit design, wherein the operational states correspond to operational capabilities of the circuitry supported by a normal power mode and one or more additional power modes for the circuitry;
   generating code coverage bins based on the operational states of the circuitry in the circuit design, wherein the code coverage bins are configured to store code coverage events occurring when the circuitry operates in the normal power mode and the one or more additional power modes;
   generating bin update rules to condition storage of one or more of the code coverage events to one or more of the code coverage bins occurring when the circuitry operates in at least one of the additional power modes; and
   utilizing the code coverage bins to record the code coverage events performed by the circuitry during functional verification operations in a verification environment based, at least in part, on the bin update rules.

2. The method of claim 1, wherein one or more of the code coverage bins are configured to identify when the circuitry enters at least one of the operational states or transitions between a plurality of the operational states during the functional verification operations.

3. The method of claim 1, further comprising generating at least one coverage metric according to the records of the code coverage event associated with the code coverage bins.

4. The method of claim 1, wherein the operational states of the circuitry in the circuit design correspond to simstates defined by the power intent specification in the unified power specification (UPF) format.

5. The method of claim 4, wherein the simstates include a normal state corresponding to a normal power mode and at least one of a corrupt state, a corrupt on activity state, a corrupt state on activity, or a corrupt state on change.

6. The method of claim 1, wherein the functional verification operations are performed by at least one of a simulator implemented by a computing system or a hardware emulator.

7. A system comprising:
   a memory device configured to store machine-readable instructions; and a computing system including one or more processing devices, in response to executing the machine-readable instructions, configured to:
  identify, from a power intent specification of a circuit design, operational states of circuitry described in the circuit design, wherein the operational states correspond to operational capabilities of the circuitry supported by a normal power mode and one or more additional power modes for the circuitry;
  generate code coverage bins based on the operational states of the circuitry in the circuit design, wherein the code coverage bins are configured to store code coverage events occurring when the circuitry operates in the normal power mode and the one or more additional power modes;
  generate bin update rules to condition storage of one or more of the code coverage events to one or more of the code coverage bins occurring when the circuitry operates in at least one of the additional power modes; and
  utilize the code coverage bins to record the code coverage events performed by the circuitry during functional verification operations in a verification environment based, at least in part, on the bin update rules.

8. The system of claim 7, wherein one or more of the code coverage bins are configured to identify when the circuitry enters at least one of the operational states or transitions between a plurality of the operational states during the functional verification operations.

9. The system of claim 7, wherein the one or more processing devices, in response to executing the machine-readable instructions, are further configured to generate at least one coverage metric according to the records of the code coverage event associated with the code coverage bins.

10. The system of claim 7, wherein the operational states of the circuitry in the circuit design correspond to simstates defined by the power intent specification in the unified power specification (UPF) format.

11. The system of claim 10, wherein the simstates include a normal state corresponding to a normal power mode and at least one of a corrupt state, a corrupt on activity state, a corrupt state on activity, or a corrupt state on change.

12. An apparatus comprising at least one computer-readable memory device storing instructions configured to cause one or more processing devices to perform operations comprising:
  identifying, from a power intent specification of a circuit design, operational states of circuitry described in the circuit design, wherein the operational states correspond to operational capabilities of the circuitry supported by a normal power mode and one or more additional power modes for the circuitry;
  generating code coverage bins based on the operational states of the circuitry in the circuit design, wherein the code coverage bins are configured to store code coverage events occurring when the circuitry operates in the normal power mode and the one or more additional power modes;
  generating bin update rules to condition storage of one or more of the code coverage events to one or more of the code coverage bins occurring when the circuitry operates in at least one of the additional power modes; and
  utilizing the code coverage bins to record the code coverage events performed by the circuitry during functional verification operations in a verification environment based, at least in part, on the bin update rules.

13. The apparatus of claim 12, wherein one or more of the code coverage bins are configured to identify when the circuitry enters at least one of the operational states or transitions between a plurality of the operational states during the functional verification operations.

14. The apparatus of claim 12, wherein the instructions are configured to cause the one or more processing devices to perform operations further comprising generating at least one coverage metric according to the records of the code coverage event associated with the code coverage bins.

15. The apparatus of claim 12, wherein the operational states of the circuitry in the circuit design correspond to simstates defined by the power intent specification in the unified power specification (UPF) format.

16. The apparatus of claim 15, wherein the simstates include a normal state corresponding to a normal power mode and at least one of a corrupt state, a corrupt on activity state, a corrupt state on activity, or a corrupt state on change.

17. The apparatus of claim 12, wherein the functional verification operations are performed by at least one of a simulator implemented by a computing system or a hardware emulator.

* * * * *